US011581996B2

(12) United States Patent
Li et al.

(10) Patent No.: US 11,581,996 B2
(45) Date of Patent: Feb. 14, 2023

(54) FLEXIBLE FRAME STRUCTURE TO SUPPORT FAST CONTROL INFORMATION DELIVERY

(71) Applicant: Nokia Technologies Oy, Espoo (FI)

(72) Inventors: Zexian Li, Espoo (FI); Mikko A. Uusitalo, Helsinki (FI); Harish Viswanathan, Basking Ridge, NJ (US); Hamidreza Shariatmadari, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/648,832

(22) PCT Filed: Sep. 24, 2018

(86) PCT No.: PCT/IB2018/057365
§ 371 (c)(1),
(2) Date: Mar. 19, 2020

(87) PCT Pub. No.: WO2019/064161
PCT Pub. Date: Apr. 4, 2019

(65) Prior Publication Data
US 2020/0252177 A1     Aug. 6, 2020

Related U.S. Application Data

(60) Provisional application No. 62/564,422, filed on Sep. 28, 2017.

(51) Int. Cl.
*H04L 5/00* (2006.01)
*H04L 1/18* (2006.01)
(Continued)

(52) U.S. Cl.
CPC ............ *H04L 5/0044* (2013.01); *H04L 1/189* (2013.01); *H04L 5/0007* (2013.01);
(Continued)

(58) Field of Classification Search
CPC ....... H04L 5/0007; H04L 5/14; H04L 1/1887; H04L 1/189; H04L 5/0094; H04L 5/0044; H04W 72/1263; H04W 72/1289
See application file for complete search history.

(56) References Cited

U.S. PATENT DOCUMENTS 8,477,667 B2 * 7/2013 Lim ................. H04W 72/0453
370/282
2012/0257559 A1 10/2012 Kim et al.
(Continued)

FOREIGN PATENT DOCUMENTS

WO      2010/122419 A2     10/2010
WO      2015/043873 A1      4/2015
WO   WO 2017193382 A1 *   11/2017  ............ H04W 72/04

OTHER PUBLICATIONS

"3rd Generation Partnership Project; Technical Specification Group Radio Access Network; Study on Scenarios and Requirements for Next Generation Access Technologies;(Release 14)", 3GPP TR 38.913, V14.3.0, Jun. 2017, pp. 1-39.
(Continued)

*Primary Examiner* — Peter Chen
(74) *Attorney, Agent, or Firm* — Squire Patton Boggs (US) LLP

(57) ABSTRACT

Apparatus, methods, systems, and computer program products for flexible frame structure in control information delivery are provided. An exemplary embodiment provides an apparatus comprising at least one processor and at least one memory including computer program code, the at least one memory and the computer program code configured to, with the at least one processor, cause the apparatus at least to receive, at a first device, a sub-frame comprising at least one symbol transmitted over a network from a network node, wherein the at least one symbol comprising control information to the first device, and transmit, from the first
(Continued)

device, scheduled data towards the network node based on the control information.

20 Claims, 5 Drawing Sheets

(51) Int. Cl.
| | |
|---|---|
| H04L 5/14 | (2006.01) |
| H04W 72/12 | (2009.01) |
| H04L 1/1867 | (2023.01) |
| H04W 72/1263 | (2023.01) |

(52) U.S. Cl.
CPC .............. *H04L 5/0094* (2013.01); *H04L 5/14* (2013.01); *H04W 72/1263* (2013.01); *H04W 72/1289* (2013.01)

(56) References Cited

U.S. PATENT DOCUMENTS

| | | | |
|---|---|---|---|
| 2014/0029484 A1* | 1/2014 | Choi ................... | H04J 3/1694 370/280 |
| 2014/0092790 A1 | 4/2014 | Zhang et al. | |
| 2015/0092757 A1 | 4/2015 | Tiirola et al. | |
| 2017/0041923 A1* | 2/2017 | Park ..................... | H04L 5/0053 |
| 2017/0202054 A1* | 7/2017 | Rathonyi .............. | H04L 5/0055 |
| 2019/0058986 A1 | 2/2019 | Loehr et al. | |

OTHER PUBLICATIONS

Shariatmadari et al., "Link adaptation design for ultra-reliable communications", IEEE International Conference on Communications (ICC), May 22-27, 2016, 5 pages.

Shariatmadari et al., "Resource allocations for ultra-reliable low-latency communications", International Journal of Wireless Information Networks, 2017, 11 pages.

Shariatmadari et al., "Control channel enhancements for ultra-reliable low-latency communications", IEEE International Conference on Communications Workshops (ICC Workshops), May 21-25, 2017, 6 pages.

"Discussion on scheduling based URLLC transmission", 3GPP TSG-RAN WG1 NR Ad Hoc #2, R1-1711004, Agenda : 5.1.3.3.8, Nokia, Jun. 27-29, 2017, 5 Pages.

"After Microsoft Deal, What's Left of Nokia Will Bet on Internet of Things", Technology Review, Retrieved on Mar. 26, 2020, Webpage available at : https://www.technologyreview.com/s/524966/after-microsoft-deal-whats-left-of-nokia-will-bet-on-internet-of-things/.

"3rd Generation Partnership Project;Technical Specification Group Services and System Aspects;Feasibility Study on New Services and Markets Technology Enablers; Stage 1 (Release 14)", 3GPP TR 22.891, V14.2.0, Sep. 2019, pp. 1-95.

"Data transmission", Wikipedia, Retrieved on Mar. 26, 2020, Webpage available at : https://en.wikipedia.org/wiki/Data_transmission.

"Computer network", Wikipedia, Retrieved on Mar. 26, 2020, Webpage available at : https://en.wikipedia.org/wiki/Computer_network.

"Telecommunication", Wikipedia, Retrieved on Mar. 26, 2020, Webpage available at : https://en.wikipedia.org/wiki/Telecommunication.

"Frame synchronization", Wikipedia, Retrieved on Mar. 26, 2020, Webpage available at : https://en.wikipedia.org/wiki/Frame_synchronization.

"3rd Generation Partnership Project; Technical Specification Group Radio Access Network; NR; Physical channels and modulation (Release 15)", 3GPP TS 38.211, V1.0.0, Sep. 2017, pp. 1-37.

"3rd Generation Partnership Project; Technical Specification Group Radio Access Network; Study on New Radio (NR) access technology (Release 14)", 3GPP TR 38.912, V14.1.0, Jun. 2017, pp. 1-74.

International Search Report and Written Opinion received for corresponding Patent Cooperation Treaty Application No. PCT/IB2018/057365, dated Dec. 21, 2018, 19 pages.

"Physical layer aspect of processing time for shortened TTI", 3GPP TSG RAN WG1 Meeting #84bis, R1-162511, Agenda : 7.3.10.3, LG Electronics, Apr. 11-15, 2016, 6 pages.

"(E)PDCCH Support for Coverage Deficit MTC Devices", 3GPP TSG RAN WG1 Meetin~ #75, R1-135132, Agenda : 6.2.2.2.3, Fujitsu, Nov. 11-15, 2013, 4 pages.

"Basic frame structure principles for SG+C21", 3GPP TSG-RAN WG1#85, R1-165027, Agenda : 7.1.4, Nokia, May 23-27, 2016, 6 pages.

Chinese Office Action corresponding to CN Application No. 201880071074.0, dated May 11, 2022.

Nokia Siemens Networks et al., "HARQ-ACK resource allocation for data scheduled via ePDCCH", 3GPP TSG-RAN WG1 Meeting #69, Prague, Czech Republic, May 21-25, 2012, R1-122428, 2 pages.

\* cited by examiner

FLEXIBLE FRAME STRUCTURE TO SUPPORT FAST CONTROL INFORMATION DELIVERY

RELATED APPLICATION

This application claims priority to PCT Application No. PCT/IB2018/057365, filed on Sep. 24, 2018, which claims priority to U.S. Provisional Application No. 62/564,422, filed on Sep. 28, 2017, each of which is incorporated herein by reference in its entirety.

TECHNICAL FIELD

The teachings in accordance with the exemplary embodiments of this invention relate generally to a flexible frame structure that enables performing retransmission to correct the errors of decoding control information and data information, and more specifically, relate to a flexible frame structure performing retransmission to correct the errors of decoding control and data information during a single sub-frame.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
5G: 5th generation mobile networks
BLER: Block error rate
CP Cyclic Prefix
DCI: Downlink control information
DTX Discontinuous transmission
FDD: Frequency division duplex
HARQ: Hybrid automatic repeat request
LTE: Long-term evolution
MCS: Modulation and coding scheme
PDCCH: Physical downlink control channel
sTTI: Short transmission time interval
TDD: Time division duplex
TTI: Transmission time interval
UE: User equipment
URLLC: Ultra-reliable low-latency communications The fifth generation (5G) of wireless systems will accommodate a wide range of services. The considered services have different requirements, such as high data rate, low-power consumption, extended coverage, ultra-reliable low-latency communications (URLLC), and massive connectivity. URLLC is a new service which enables emerging new applications from various verticals, like industrial automations, autonomous driving, vehicular safety, e-health services. 3GPP targets include providing the connectivity with reliability corresponding to block error rate (BLER) of $10^{-5}$ and up to 1 ms U-Plane latency in the future networks. The service should be available ubiquitously and almost all the time.

Realizing the URLLC over the wireless channels requires providing high level of reliabilities for the channels carrying data and/or control information. The example embodiments of the invention provide a flexible frame structure to ensure high reliabilities including missed control signal detection in order to support communications technologies including URLLC.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose a flexible frame structure that enables performing retransmission to correct the errors of decoding control and data information during a single sub-frame.

3GPP has been defining physical layer technologies for 5G cellular communications. 5G services (e.g. URLLC) and new features of 5G (e.g., support of cm- and mm bands) require new frame structures. 5G frame structures provide a fixed and a flexible part. The new structures facilitate mixed numerologies and low latency operations.

Figure 1A:
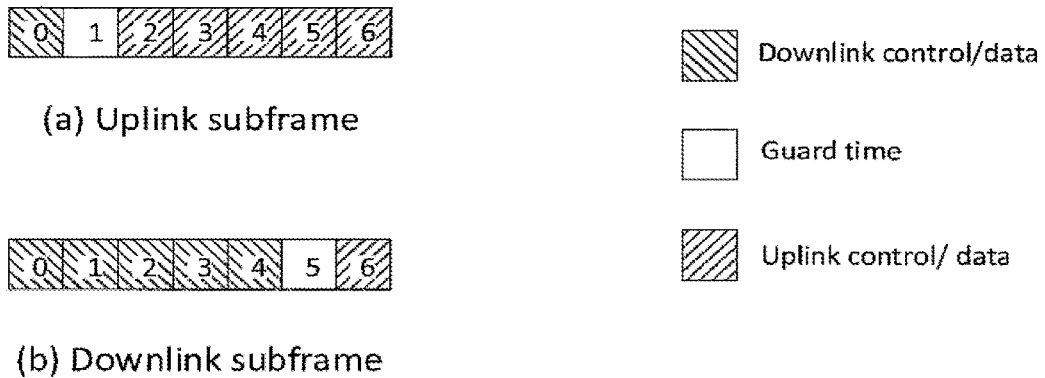
FIG. 1A shows self-contained sub-frame.

The 5G network is expected to support both FDD and TDD frame structures. In the former case, a UE can transmit and receive simultaneously, while in the latter case, it cannot perform the simultaneous transmission and reception. The self-contained sub-frame structure is considered as one of the promising solutions for achieving low-latency communications. The low-latency is achieved by transmitting data and feedback information in a same sub-frame. FIG. 1A(a) and FIG. 1A(b) illustrates examples of the self-contained sub-frame structure for uplink and downlink data transmissions, respectively. One main difference between the FDD and TDD frame structures can include that frame allocation for Uplink and Downlink may be settable in TDD. Further, a sampling rate in FDD and TDD can be the same and both operate under a 1 ms TTI, e.g., 0.125 ms TTI. In both cases, the downlink control information (DCI) is transmitted at the beginning of the sub-frame. DCI carries the resource allocations for uplink and downlink transmissions and it is prerequisite for performing the UL data transmissions and DL data reception. The symbol length will scale with the subcarrier spacing in the sub-frame structure, and there may be either 7 or 14 symbols per sub-frame. Cyclic prefix (CP) lengths also depend on subcarrier spacing, whereas multiple CP lengths per subcarrier spacing may be configured.

Cellular systems, such as LTE, defines several physical channels to segregate different information types. Generally, the channels are categorized as data and control channels, which all affect the communications reliability. For instance, the control channel is utilized to deliver downlink and uplink resource allocation information. The error of decoding the DCI results in failure in performing the data reception and/or transmissions. Another example is the uplink control channel that carries ACK/NACK signals. Errors of decoding these signals affect the performance of the HARQ process. In this regards, higher levels of reliabilities are required for data and control channels compared to ones that provided by the current LTE system in order to enable Ultra-Reliable Low Latency Communications (URLLC).

URLLC is an important service of 5G, and can require shorter TTI compared to the employed in LTE, for instance, by using mini-slots. Mini-slots define a sub-slot structure that can be used for low latency applications such as URLLC. Mini-slots may consist of one or more symbols. Further, for low latency support hybrid automatic repeat request (HARQ) can be configured either on a slot or a mini-slot basis. For non-delay critical services slot bundling may also be possible. Mini-slots may also be used for fast flexible scheduling of services.

To achieve the reliability requirements, the system should be able to detect and correct the errors of decoding the control and data information. The error correction is typically performed by employing the control/data retransmissions. Considering the sub-frame scheduling based in the existing frame structures, the retransmission is performed after at least one sub-frame duration that introduces the additional latency. Hence, the latency constraint might be violated. To address this issue, the example embodiments of the invention provide a flexible frame structure that enables performing the retransmission, particularly for control information, during a single sub-frame. This allows delivering the control information reliably and efficiently.

For reference to the features as described herein in accordance with the example embodiments it is noted that a radio frame is a digital data transmission unit in computer networking and telecommunication. According to 3GPP TS 38.211 V1.0.0 section 4.3 Frame structure: a radio frame is a processing duration which consists of 10 subframes. A frame can typically include frame synchronization features consisting of a synchronization sequences that indicate to the receiver for the purpose of synchronization. 3GPP TS 38.211 discloses that downlink and uplink transmissions are organized into frames with duration, consisting of ten subframes of duration each. The number of consecutive OFDM symbols per subframe is $N_{symb}^{subframe,\mu} = N_{symb}^{slot} N_{slot}^{subframe,\mu}$. Each frame is divided into two equally-sized half-frames of five subframes each. There is one set of frames in the uplink and one set of frames in the downlink on a carrier. Transmission of uplink frame number $i$ from the UE shall start $T_{TA} = N_{TA}T_s$ before the start of the corresponding downlink frame at the UE.

Further, according to 3GPP TS 38.211 V1.0.0 section 4.3.2 Slots: for subcarrier spacing configuration, slots are numbered $n_s^\mu \in \{0, \ldots N_{slot}^{subframe,\mu}-1\}$ in increasing order within a subframe and $n_{s,f}^\mu \in \{0, \ldots, N_{slot}^{frame,\mu}-1\}$ in increasing order within a frame. There are $N_{symb}^{slot}$ consecutive OFDM symbols in a slot where $n_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe. A slot can contain all downlink, all uplink, or at least one downlink part and at least one uplink part and one slot consists of a number of OFDM symbols. The start of slot in a subframe is aligned in time with the start of OFDM symbol in the same subframe. In addition, in TR38.912 v14.1.0, mini-slot is defined to facilitate the low latency services and the length of mini-slot can be from 1 OFDM symbol to (number of OFDM symbols in one slot-1).

Figure 1B:
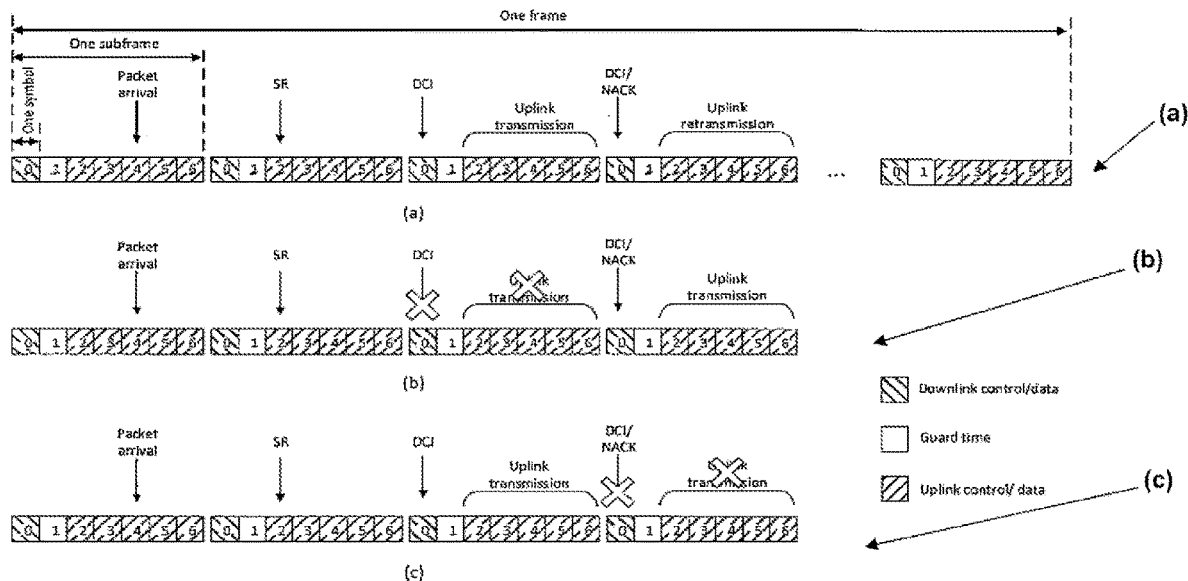
FIG. 1B shows uplink data transmissions with self-contained sub-frames.

FIG. 1B(a) illustrates the uplink data transmissions with TDD self-contained sub-frame structure. When a packet arrives, the UE needs to inform the eNodeB by sending a scheduling request. The eNodeB then allocates the uplink radio resources and informs the UE by sending a DCI. When the UE decodes the DCI correctly, it can start sending uplink data after a guard time period. In case the eNodeB cannot decode the data message correctly, it sends a new DCI and/or NACK to the UE in the next sub-frame and requests for performing the data retransmission. The UE might miss the DCI or NACK signals, in such cases, it would not perform the data transmission/retransmission. FIG. 1B(b) shows the case that the UE misses the DCI for the initial transmission, while FIG. 1B(c) illustrates the case that the UE misses the DCI/NACK for the data retransmissions. In both cases, only one data transmission can be performed during 4 sub-frames, and more retransmissions might sacrifice the latency requirement (data should be delivered within 4 consecutive sub-frames with the TTI of 0.125 ms in order to meet a 0.5 ms latency limit in the uplink) This frame structure does not allow to retransmit the missed DCI in the same sub-frame to trigger the data transmission/retransmission. The example embodiments of the invention enable an increase of a possible number of retransmission at least to meet and/or exceed the latency requirements, e.g., 0.5 ms.

Herein there is disclosed in accordance with example embodiments of the invention a flexible frame structure that enables performing retransmission to correct the errors of decoding control and data information during a single sub-frame.

Figure 2:
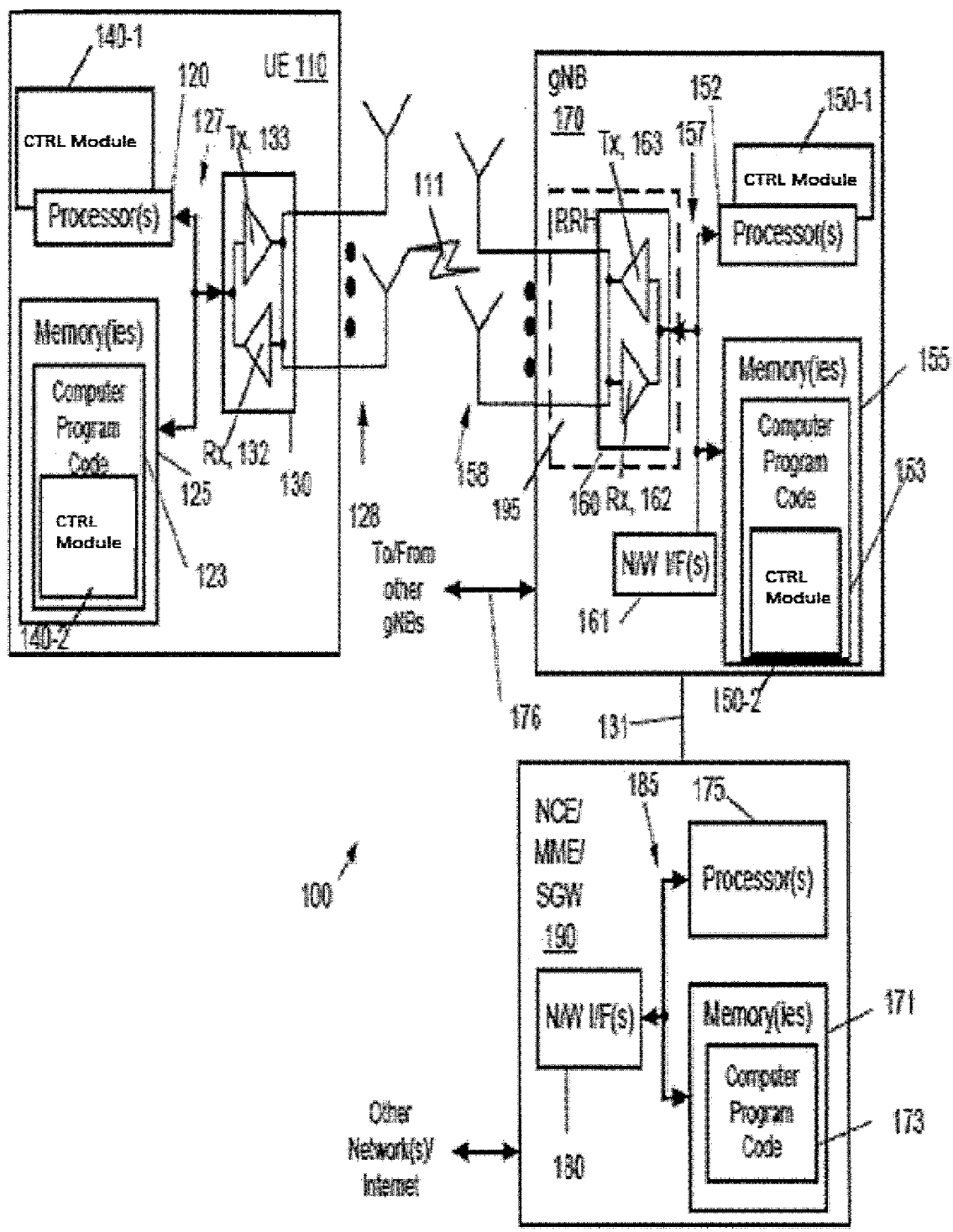
FIG. 2 shows a high level block diagram of various devices used in carrying out various aspects of the invention.

Before describing the example embodiments of the invention in further detail reference is made to FIG. 2. FIG. 2 shows a block diagram of one possible and non-limiting exemplary system in which the exemplary embodiments may be practiced. In FIG. 2, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver Rx, 132 and a transmitter Tx 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 may include a CTRL module 140 which is configured to perform the example embodiments of the invention as described herein. The CTRL module 140 comprising one of or both parts 140-1 and/or 140-2, which may be implemented in a number of ways. The CTRL module 140 may be implemented in hardware as CTRL module 140-1, such as being implemented as part of the one or more processors 120. The CTRL module 140-1 may be implemented also as an integrated circuit or through other hardware such as a programmable gate array. In another example, the CTRL module 140 may be implemented as CTRL module 140-2, which is implemented as computer program code 123 and is executed by the one or more processors 120. For instance, the one or more memories 125 and the computer program code 123 may be configured, with the one or more processors 120, to cause the UE 110 to perform one or more of the operations as described herein. The UE 110 communicates with gNB 170 via a wireless link 111.

The gNB 170 (NR/5G Node B or possibly an evolved NB) is a base station (e.g., for LTE, long term evolution and/or 5G) that provides access by wireless devices such as the UE 110 to the wireless network 100. The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver Rx 162 and a transmitter Tx 163. The one or more transceivers 160 are connected to one or more antennas 158. The one or more memories 155 include computer program code 153. The gNB 170 includes a CTRL module 150 which is configured to perform example embodiments of the invention as described herein. The CTRL module 150 comprising one of or both parts 150-1 and/or 150-2, which may be implemented in a number of ways. The CTRL module 150 may be implemented in hardware as CTRL module 150-1, such as being implemented as part of the one or more processors 152. The CTRL module 150-1 may be implemented also as an integrated circuit or through other hardware such as a programmable gate array. In another example, the CTRL module 150 may be implemented as CTRL module 150-2, which is implemented as computer program code 153 and is executed by the one or more processors 152. For instance, the one or more memories 155 and the computer program code 153 are configured to cause, with the one or more processors 152, the gNB 170 to perform one or more of the operations as described herein. The one or more network interfaces 161 communicate over a network such as via the links 176 and 131. Two or more gNB 170 may communicate using, e.g., link 176. The link 176 may be wired or wireless or both and may implement, e.g., an X2 interface.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the gNB 170 being physically in a different location from the RRH, and the one or more buses 157 could be implemented in part as fiber optic cable to connect the other elements of the gNB 170 to the RRH 195.

The wireless network 100 may include a network control element (NCE) 190 that may include MME (Mobility Management Entity)/SGW (Serving Gateway) functionality, and which provides connectivity with a further network, such as a telephone network and/or a data communications network (e.g., the Internet). The gNB 170 is coupled via a link 131 to the NCE 190. The link 131 may be implemented as, e.g., an Si interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The one or more memories 125, 155, and 171 each comprise a computer-readable medium and are computer readable and may be of any type suitable to the local technical environment and may be implemented using any suitable data storage technology, such as semiconductor based memory devices, flash memory, magnetic memory devices and systems, optical memory devices and systems, fixed memory and removable memory. The one or more memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, and other functions as described herein.

In general, the various embodiments of the UE 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein including generating the flexible frame structure for transmission and/or retransmission and receiving the flexible frame structure may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium or other device that may be any media or means that can contain or store the instructions for use by or in connection with an instruction execution system, apparatus, or device, such as a computer.

In a proposed flexible frame structure in accordance with the example embodiments, the DCI can be transmitted not only at the beginning of a sub-frame, but also during a sub-frame by introducing special symbol(s) in the sub-frame. From eNodeB point of view, at one symbol or multiple symbols time period, it is operated in full duplex mode (i.e. transmission and reception at the same time). While from UE point of view, no such requirement.

Figure 3:
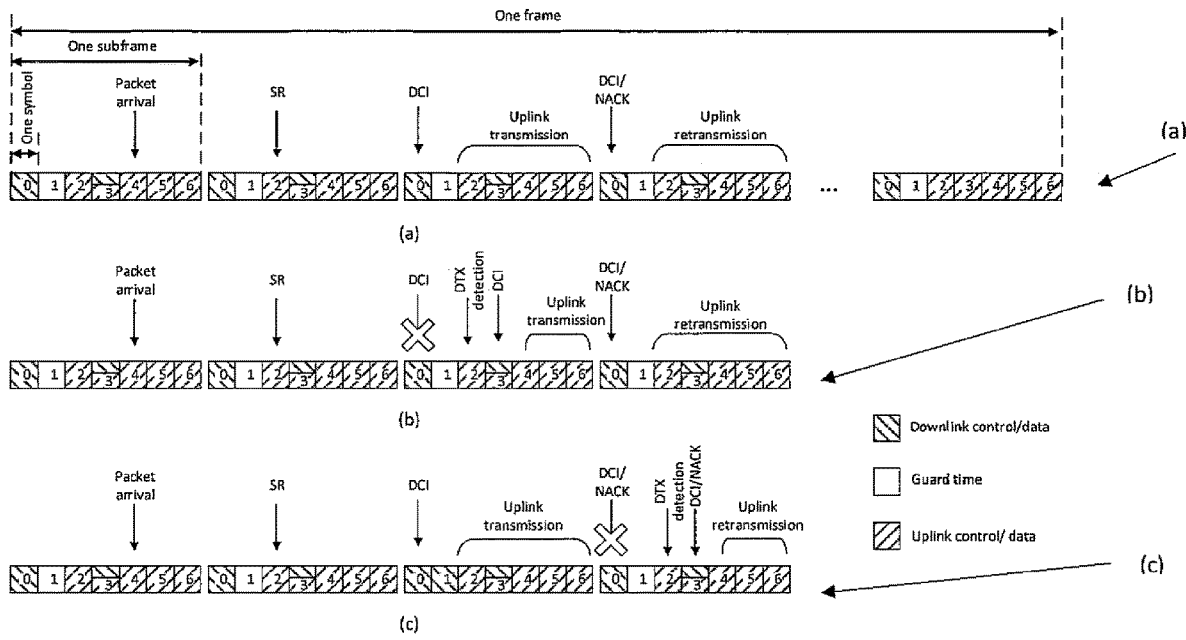
FIG. 3 shows a flexible frame structure for uplink transmissions in TDD system in accordance with the example embodiments of the invention.

FIG. 3 illustrates one example of the proposed flexible frame structure for TDD system. The control information can be carried over the symbol 0 and 3 in each sub-frame. In FIG. 3(*a*), the UE, such as the UE 110 of FIG. 2, decodes the DCI for the initial data transmission and retransmission successfully. Hence, two data transmission rounds are performed. In FIG. 3(b), the UE misses the DCI which contains the resource allocation for the initial transmission, hence it does not start transmitting data from the symbol 2. Hence, it remains in downlink mode in order to monitor the control channel. The eNodeB, such as the gNB 170 of FIG. 2, distinguishes that the UE has missed the DCI as it did not receive any signal, i.e., DTX. The eNodeB retransmits DCI in symbol 3 to trigger the data transmission. The UE decodes the retransmitted DCI and then switches to the uplink mode and starts transmitting the data. In FIG. 3(c), there is illustrated a case in which the UE misses DCI/NACK. The eNodeB distinguishes this event and retransmits the DCI in the same sub-frame. The UE starts performing the data retransmission when it decodes the retransmitted DCI. In both cases, the UE can be triggered after it misses DCI. However, when the UE decodes the retransmitted DCI, it has less time to deliver data compared to the case that the DCI is decoded at the beginning of the sub-frame. To compensate the reduced transmission time, the eNodeB can perform a new resource allocation with resource expansion in frequency domain for example to increase the reliability when it detects the DTX. In this case, the retransmitted DCI would be different from the one transmitted at the beginning of the sub-frame.

It is noted that in accordance with the example embodiments of the invention DTX may be detected by a mobile device such as a UE, and/or a base station type device (e.g., eNB) can determine an occurrence of DTX when the device detects that there is no data presence in the resource previous allocated to a device or the UE.

Further, it is noted that a person of ordinary skill in the art would understand that the terms frame, half-frame, sub-frame, slot, and symbol as may be used herein are based on signaling time units. Further, these terms e.g., slot and sub-frame and/or slot and mini-slot, and/or subframe and sub-frame as may be used herein can inter-changeably refer to time units in describing the example embodiments of the invention as disclosed herein. It is noted that the use of any of these terms over the other is not limiting to the example embodiments of the invention.

It should be pointed out that in FIG. 3 the processing time may be ignored, but the concept works well even with certain processing time. In this case the location of the full duplex symbol (i.e. symbol #3) can be changed. The expansion of control channel over the uplink symbols enables to retransmit the missed DCI in the same sub-frame and triggers the data transmission/retransmission. It requires that the eNodeB performs in full duplex in order to retransmit the DCI while receiving the uplink data. However, the UE still operates in half-duplex mode, as it is not required to transmit and receive simultaneously. The proposed frame structure is also applicable to FDD by expanding the control radio resources over the sub-frames. Below there is presented some of the additional benefits that can be achieved from the proposed scheme.

The proposals in accordance with the example embodiments as described herein are applicable to both FDD and TDD systems. In TDD case, the eNodeB needs to operate in full-duplex mode while the UE still operates in the half-duplex mode. The proposed scheme can be used with different configurations to increase the reliability of control information.

Figure 4:
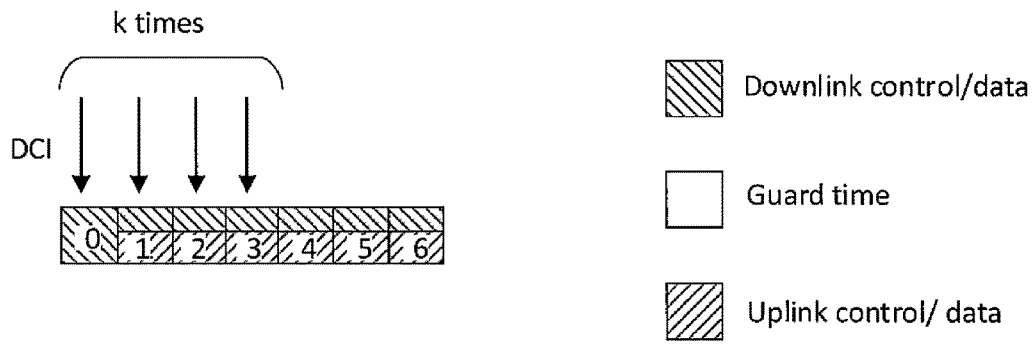
FIG. 4 shows a frame structure for blind DCI repetition in accordance with the example embodiments of the invention.

Another configuration for the proposed scheme in accordance with the example embodiments can use blind DCI repetition. FIG. 4 shows the DCI repetition over κ consecutive symbols. The UE, such as the UE 110 of FIG. 2, would start transmitting the data in uplink after it decodes one of the DCI. Compared to FIG. 3 the UE would be able to receive a DCI replica earlier (i.e. symbol 1 and 2), also a higher order of repetitions can be used. However, the cost of blind repetition is the waste of resources for carrying the DCI. Hence, the blind DCI repetition should be used for UEs with poor channel conditions with the high chance of miss-detecting the DCI. For other UEs, performing the DCI retransmission after detecting the missed DCI as shown in FIG. 3 is the better option.

Figure 5:
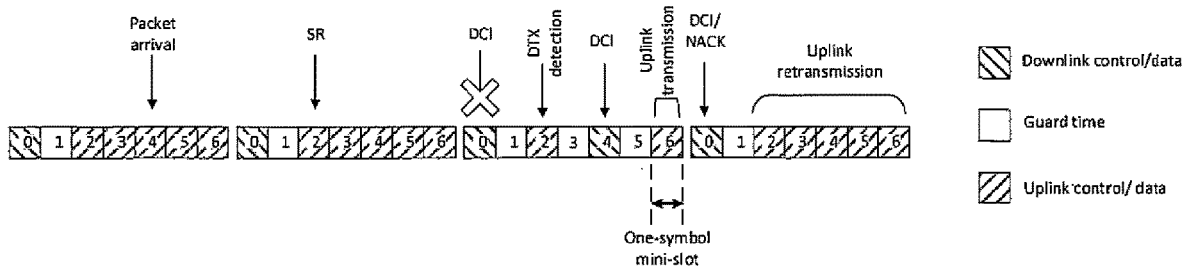
FIG. 5 shows an example frame structure for supporting fast DCI retransmission without introducing full duplex support at a base station in accordance with the example embodiments of the invention.

Another alternative embodiment in accordance with the invention is to implement the idea, such as by the gNB 170 of FIG. 2, with a mini-slot without introducing full duplex at a base station or gNB. Taking UL data transmission as shown in FIG. 3(b) as one example, one example embodiment can be implemented as shown in FIG. 5 where after DTX detected in UL reception, the eNB or eNodeB changing the sub-frame structure to "one symbol OFDM mini-slot" case and transmits DCI again. One possible drawback with this approach is the impact on other scheduled UEs. The benefit is no need to have full duplex support at eNodeB.

Further, it is noted that in 5G NR, one frame can include multiple subframes similar as in LTE. A slot and subframe can refer to the same structure. Further, a mini-slot is a recent concept and the length is configurable from one to n OFDM symbols (n being a number of OFDM symbols in one slot−1). Example embodiments of the invention may be based on slot and/or subframe, and FIG. 5 can be based on the combination of slot and mini-slot.

Figure 6:
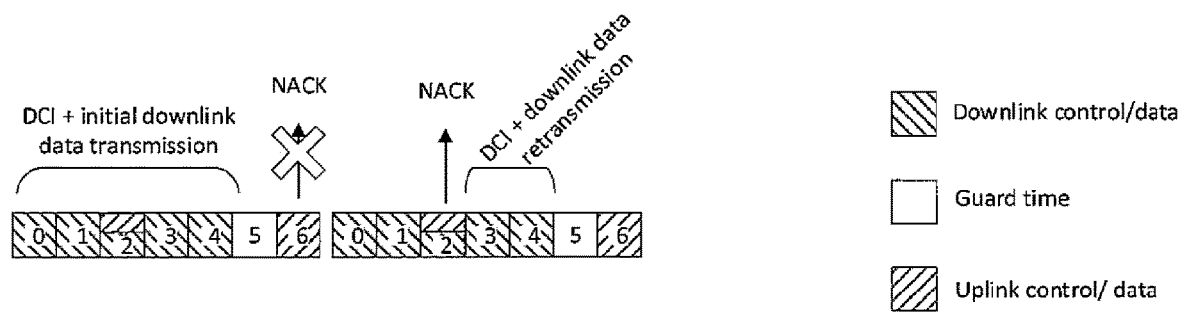
FIG. 6 shows a flexible frame structure for downlink transmissions in accordance with the example embodiments of the invention.

The flexible frame structure in accordance with the example embodiments can be used for downlink data transmissions. As shown FIG. 6 the eNodeB transmits DCI and downlink data in the first sub-frame. The UE decodes the DCI correctly, while it cannot retrieve the data successfully. Hence, it sends a NACK signal to request the data retransmissions. The eNodeB misinterprets the NACK as ACK and assumes that the data has been received correctly. Hence, it does not perform the data retransmission in the next sub-frame. The UE monitors the control channel in the next sub-frame and does not detect a new DCI. Hence, it switches back to the uplink and retransmits the NACK over the symbol 2. The eNodeB detects the repeated NACK signal and performs the data retransmission starting from the next symbol.

Figure 7:
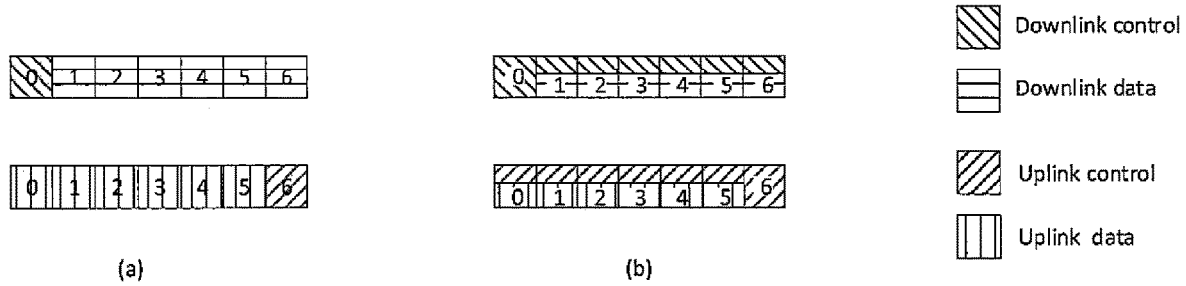
FIG. 7 shows a frame structures for FDD system in accordance with the example embodiments of the invention.

FIG. 7(a) illustrates the existing self-contained sub-frame structure for FDD system, while FIG. 7(b) shows the proposed flexible frame structure for FDD. In the proposed frame structure, the control information might exist over the whole symbols within a sub-frame, or over some selected symbols.

Figure 8A:
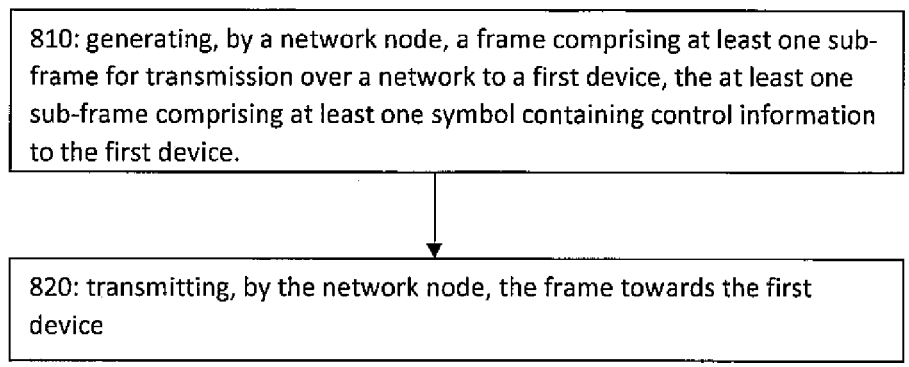
FIGS. 8A and 8B each show a method in accordance with example embodiments of the invention which may be performed by an apparatus.

FIG. 8A illustrates operations which may be performed by a network device such as, but not limited to, a base station such as the gNB 170 as in FIG. 2. As shown in step 810 there is generating, by a network node, a frame comprising at least one sub-frame for transmission over a network to a first device, the at least one sub-frame comprising at least one symbol containing control information to the first device. Then as shown in step 820 of FIG. 8A there is transmitting, by the network node, the frame towards the first device.

In accordance with the example embodiments as described in the paragraph above, the control information identifies a resource allocation for the first device.

In accordance with the example embodiments as described in the paragraphs above, the transmitting comprises a re-transmission of the control information previously transmitted to the first device.

In accordance with the example embodiments as described in the paragraphs above, the transmitting comprises transmission of a different control information than the one previously transmitted to the first device.

In accordance with the example embodiments as described in the paragraphs above, the re-transmission and/or the transmission of the control information previously transmitted or the different control information is based on a detection of at least one of a discontinuous transmission and a negative acknowledgement from the first device associated with the previously transmitted control information.

In accordance with the example embodiments as described in the paragraphs above, the re-transmitted control information and/or the transmitted different control information may be transmitted immediately after the transmission of the previously transmitted control information.

In accordance with the example embodiments as described in the paragraphs above, wherein the re-transmission comprises re-transmission of a symbol with the same or different control information previously transmitted, wherein the same or different control information is re-transmitted in a symbol consecutive or next to the previously transmitted symbol.

In accordance with the example embodiments as described in the paragraphs above there is, based on the detection of the at least one of the discontinuous transmission and the negative acknowledgement the retransmitted control information comprises a resource allocation using an expanded resource in frequency domain, wherein the at least one symbol comprises the control information.

In accordance with the example embodiments as described in the paragraphs above, wherein the retransmitted control information is in a same sub-frame as the previously transmitted control information to trigger the first device to transmit scheduled data using another resource allocation.

In accordance with the example embodiments as described in the paragraphs above, the sub-frame comprises uplink symbols to enable an uplink data transmission by the first device.

In accordance with the example embodiments as described in the paragraphs above, the control information is retransmitted by the network node in a full duplex mode for at least one symbol.

In accordance with the example embodiments as described in the paragraphs above, wherein the control information is repeated in each of more than one consecutive symbol of the sub-frame or different control information can be sent in consecutive symbol.

In accordance with the example embodiments as described in the paragraphs above, wherein the sub-frame is using a one symbol OFDM mini-slot structure.

In accordance with the example embodiments as described in the paragraphs above, the control information is re-transmitted in a same sub-frame as the control information previously transmitted.

A non-transitory computer-readable medium (Memory(ies) 155 of FIG. 2) storing program code (Computer Program Code 153 of FIG. 2), the program code executed by at least one processor (Processors 152, and/or CTRL Modules 150-1 and/or 150-2 of FIG. 2) to perform the operations as at least described in the paragraphs above.

In accordance with an example embodiment of the invention as described above there is an apparatus comprising: means for generating (Computer Program Code 153 and Processors 152, and/or CTRL Modules 150-1 and/or 150-2 of FIG. 2), by a network node (gNB 170 of FIG. 2), a frame comprising at least one sub-frame for transmission over a network to a first device (UE 110 of FIG. 2), the at least one sub-frame comprising at least one symbol containing control information to the first device; and means for transmitting (Tx 163 of FIG. 2), by the network node (gNB 170 of FIG. 2), the sub-frame towards the first device (UE 110 of FIG. 2).

In the example aspect of the invention according to the paragraph above, wherein at least the means for generating and transmitting comprises a non-transitory computer readable medium [Memory(ies) 155] encoded with a computer program [Computer Program Code 153 of FIG. 2] executable by at least one processor [Processor(s) 152, and/or CTRL Modules 150-1 and/or 150-2 of FIG. 2].

Figure 8B:
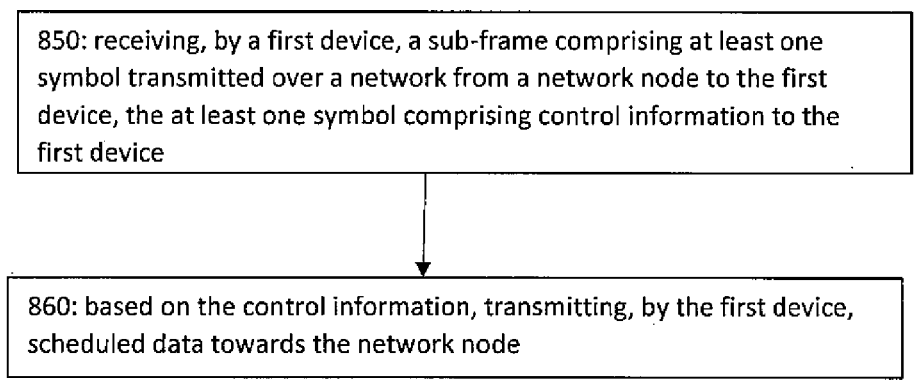

FIG. 8B illustrates operations which may be performed by a device such as, but not limited to, a device (e.g., the UE 110 as in FIG. 2). As shown in step 850 of FIG. 8B there is receiving, by a first device, a sub-frame comprising at least one symbol transmitted over a network from a network node, the at least one symbol comprising control information to the first device; and as shown in step 860 of FIG. 8B there is, based on the control information, transmitting, by the first device, scheduled data towards the network node.

In accordance with the example embodiments as described in the paragraph above, the control information identifies a resource allocation for the scheduled data from the first device.

In accordance with the example embodiments as described in the paragraphs above, the sub-frame comprises a re-transmission of control information previously transmitted to the first device or transmission of a different control information than the one previously transmitted to the first device.

In accordance with the example embodiments as described in the paragraphs above, wherein the re-transmission comprises re-transmission of a symbol with the same or different control information previously transmitted, wherein the same or different control information is re-transmitted in a symbol consecutive or next to the previously transmitted symbol.

In accordance with the example embodiments as described in the paragraphs above, the re-transmission of the control information previously transmitted and/or the transmission of the different control information is based on an indication of at least one of a discontinuous transmission and a negative acknowledgement associated with the previously transmitted control information. The re-transmitted control information and/or the transmitted different control information may be transmitted immediately after the transmission of the previously transmitted control information.

In accordance with the example embodiments as described in the paragraphs above, the re-transmission of the control information comprises another resource allocation using an expanded resource in frequency domain, wherein the resource allocation is for scheduled data transmission.

In accordance with the example embodiments as described in the paragraphs above, the first device transmits the scheduled data based on the re-transmitted control information and the another resource allocation.

In accordance with the example embodiments as described in the paragraphs above, the control information is repeated in each of more than one consecutive symbols of the sub-frame.

In accordance with the example embodiments as described in the paragraphs above, the sub-frame is using a one symbol OFDM mini-slot structure.

In accordance with the example embodiments as described in the paragraphs above, the re-transmitted control information is either the previously transmitted control information in the same sub-frame or a new control information.

A non-transitory computer-readable medium (Memory(ies) 125 of FIG. 2) storing program code (Computer Program Code 123 of FIG. 2), the program code executed by at least one processor (Processor(s) 120, and/or CTRL Modules 140-1 and/or 140-2 of FIG. 2) to perform the operations as at least described in the paragraphs above.

In accordance with an example embodiment of the invention as described above there is an apparatus comprising: means for receiving (Rx 132 of FIG. 2), by a first device (UE 110 of FIG. 2), a sub-frame comprising at least one symbol transmitted over a network from a network node (gNB 170 of FIG. 2) to the first device (UE 110 of FIG. 2), the at least one symbol comprising control information to the first device; and means, based on the control information (Computer Program Code 123, and Processors 120 and/or CTRL Modules 140-1 and/or 140-2 of FIG. 2), for transmitting (Tx 133 of FIG. 2), by the first device (UE 110 of FIG. 2), scheduled data towards the network node (gNB 170 of FIG. 2).

In the example aspect of the invention according to the paragraph above, wherein at least the means for receiving and transmitting comprises a transmitter and receiver [Tx 133 and Rx 132] a non-transitory computer readable medium [Memory(ies) 125] encoded with a computer program [Computer Program Code 123 of FIG. 2] executable by at least one processor [Processor(s) 120, and/or CTRL Modules 140-1 and/or 140-2 of FIG. 2].

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

We claim:

1. An apparatus comprising:
   at least one processor; and
   at least one memory including computer program code,
     the at least one memory and the computer program code configured to, with the at least one processor, cause the apparatus at least to:
     receive a sub-frame in time division duplex comprising at least one symbol transmitted over a network from a network node operating in full duplex mode, wherein the at least one symbol is used simultaneously for both downlink communication from the network node and uplink communication to the network node, wherein the at least one symbol comprising control information to the apparatus; and
     transmit scheduled data towards the network node based on the control information in time division duplex,
   wherein the at least one memory and the computer program code are further configured to, with the at least one processor, cause the apparatus at least to decode retransmitted downlink control information associated with the control information; switch to an uplink mode; and transmit the scheduled data.

2. An apparatus as in claim 1, wherein the control information identifies a resource allocation for the scheduled data from the apparatus.

3. An apparatus as in claim 1, wherein the sub-frame comprises a retransmission of control information previously transmitted to the apparatus or transmission of a different control information than the control information previously transmitted to the apparatus.

4. An apparatus as in claim 3, wherein the retransmission comprises retransmission of a symbol with same or different control information previously transmitted.

5. An apparatus as in claim 4, wherein the same or different control information is retransmitted in a symbol consecutive or next to the previously transmitted symbol.

6. An apparatus as in claim 3, wherein the retransmission of the control information previously transmitted and/or the transmission of the different control information is based on an indication of at least one of a discontinuous transmission or a negative acknowledgement associated with the previously transmitted control information.

7. An apparatus as in claim 6, wherein the retransmitted control information and/or the transmitted different control information is transmitted immediately after the transmission of the previously transmitted control information.

8. An apparatus as in claim 3, wherein the retransmission of the control information comprises another resource allocation using an expanded resource in frequency domain.

9. An apparatus as in claim 8, wherein the another resource allocation is for scheduled data transmission.

10. An apparatus as in claim 8, wherein the at least one memory and the computer program code further configured to, with the at least one processor, cause the apparatus at least to: transmit the scheduled data based on the retransmitted control information and the another resource allocation.

11. An apparatus as in claim 3, wherein the retransmitted control information is either the previously transmitted control information in the same sub-frame or a new control information.

12. An apparatus as in claim 1, wherein the control information is repeated in each of more than one consecutive symbols of the sub-frame.

13. An apparatus as in claim 1, wherein the sub-frame is using a one symbol orthogonal frequency division multiplexing mini-slot structure.

14. An apparatus as in claim 1, further comprising receiving a retransmission of the control information in a full duplex mode for at least one symbol.

15. An apparatus as in claim 1 comprising a first device.

16. An apparatus comprising:
   at least one processor; and
   at least one memory including computer program code, the at least one memory and the computer program code configured to, with the at least one processor, cause the apparatus at least to:
      generate a frame comprising at least one sub-frame for transmission over a network to a first device, wherein the at least one sub-frame comprises at least one symbol including control information to the first device; and
      transmit the frame towards the first device in time division duplex, wherein the apparatus operates in full duplex mode, wherein the at least one symbol is used simultaneously for both downlink communication from the network node and uplink communication to the network node,
      wherein the at least one memory and the computer program code are further configured to, with the at least one processor, cause the apparatus at least to retransmit downlink control information associated with the control information to the first device.

17. An apparatus as in claim 16, wherein the control information identifies a resource allocation for the first device.

18. An apparatus as in claim 16, wherein the transmitting comprises a retransmission and/or a transmission of the control information previously transmitted to the first device, or transmission of a different control information than the control information previously transmitted to the first device.

19. An apparatus as in claim 18, wherein the retransmission and/or the transmission of the control information previously transmitted or the transmission of the different control information is based on a detection of at least one of a discontinuous transmission or a negative acknowledgement from the first device associated with the previously transmitted control information.

20. A method comprising:
   receiving, at a first device, a sub-frame in time division duplex comprising at least one symbol transmitted over a network from a network node operating in full duplex mode, wherein the at least one symbol is used simultaneously for both downlink communication from the network node and uplink communication to the network node, wherein the at least one symbol comprising control information to the first device; and
   transmitting, from the first device, scheduled data towards the network node based on the control information in time division duplex,
   the method further comprising decoding, at the first device, retransmitted downlink control information associated with the control information; switching, at the first device, to an uplink mode; and transmitting, from the first device, the scheduled data.

* * * * *